United States Patent

Hoshal et al.

[11] Patent Number: 6,122,959
[45] Date of Patent: Sep. 26, 2000

[54] METHOD AND APPARATUS FOR RECORDING PHYSICAL VARIABLES OF TRANSIENT ACCELERATION EVENTS

[75] Inventors: Gregory D. Hoshal, Okemos; Rodney J. Lambert, Lansing; Stefano A. M. Lassini, Okemos, all of Mich.

[73] Assignee: Instrumented Sensor Technology, Inc., Okemos, Mich.

[21] Appl. No.: 09/007,278

[22] Filed: Jan. 14, 1998

(Under 37 CFR 1.47)

[51] Int. Cl.[7] .............................. G01P 15/00; G01D 1/14
[52] U.S. Cl. .............................. 73/489; 73/495; 73/503; 702/141; 702/187
[58] Field of Search ........................... 73/489, 488, 491, 73/503, 495, 509; 702/130, 138, 141, 176, 187

[56] References Cited

U.S. PATENT DOCUMENTS

| | | | |
|---|---|---|---|
| 3,781,824 | 12/1973 | Caiati et al. | 340/22 |
| 4,114,450 | 9/1978 | Shulman et al. | 73/489 |
| 4,378,574 | 3/1983 | Stephenson | 360/71 |
| 4,638,289 | 1/1987 | Zottnik | 73/517 A |
| 4,745,564 | 5/1988 | Tennes et al. | 73/489 |
| 4,862,394 | 8/1989 | Thompson et al. | 73/489 |
| 4,992,943 | 2/1991 | McCracken | 73/514 |
| 5,067,099 | 11/1991 | McCowan et al. | 364/550 |
| 5,426,595 | 6/1995 | Picard | 364/569 |
| 5,444,637 | 8/1995 | Smesny | 364/556 |
| 5,445,024 | 8/1995 | Riley et al. | 73/489 |
| 5,475,597 | 12/1995 | Buck | 364/443 |
| 5,540,099 | 7/1996 | Harashima | 73/669 |
| 5,541,860 | 7/1996 | Takei et al. | 73/489 |
| 5,576,491 | 11/1996 | Bozeman | 73/491 |
| 5,587,932 | 12/1996 | Ferrante et al. | 364/556 |
| 5,631,427 | 5/1997 | Bridges | 73/658 |
| 5,638,299 | 6/1997 | Miller | 364/550 |
| 5,754,449 | 5/1998 | Hoshal et al. | 364/550 |

OTHER PUBLICATIONS

Electronics Development Corporation Acceleration Recorder documentation—Jul. 13, 1994.
Shock watch MAG 3200 series documentation.
Silicon Designs, Inc. G–Logger Acceleration Acquisition System documentation—May 1997.
Elexor Associates, Inc. RM–5000 Indelligent Remote Monitoring System and Satellite Earth—Station documentation.
Swords into Plow shares: A Smart Approach to Freight Damage Prevention by Tim Slifkin of Elexor Associates, Inc.
SMT & Hybrid GmbH Monilog Shock Detector and EnDol documentation—Mar. 1995.
AMP, Inc. Shockwriter 3000 documentation and related article from Sensor Business Digest—May 1995.
Instrumented Sensor Technology, Inc. Snap Shock 2000 documentation.

*Primary Examiner*—Helen C. Kwok
*Attorney, Agent, or Firm*—Warner Norcross & Judd LLP

[57] ABSTRACT

An acceleration recorder and related method for monitoring, discriminating, and recording acceleration events only when the acceleration and calculated velocity change both exceed selected trigger values. While the acceleration values meet a first, user-defined threshold, the acceleration values are integrated to calculate a velocity change value. If the velocity change value meets a second, user-defined threshold, the acceleration event, including the velocity change, is recorded in memory.

45 Claims, 4 Drawing Sheets

METHOD AND APPARATUS FOR RECORDING PHYSICAL VARIABLES OF TRANSIENT ACCELERATION EVENTS

BACKGROUND OF THE INVENTION

The present invention relates to data recording and, more particularly, to a method and apparatus for discriminating acceleration events and recording only those that meet pre-determined criteria.

A wide variety of recording devices have been developed to sense and record numerous physical variables such as shock, vibration, strain, force, temperature, humidity, and even barometric pressure. Because of their ability to measure and record such a broad range of variables, these devices have many applications. For example, data recorders are commonly used in the transportation industry to detect and record the environmental conditions experienced by cargo during transportation and handling. The data collected by the recorders is later analyzed and used to determine how the transportation and handling process can be improved or to determine where, during the transportation process, the cargo was damaged.

In another application, data recorders are used to detect and record seismic activity. These devices may be used, for example, in the construction and mining industries to detect and record the energy of vibrations generated by explosive charges.

Data recording devices typically record data in either a continuous format or a discrete format. Continuous recording devices simply record data continuously from the start to the end of a recording session. This technique is not well suited to collecting data over long recording sessions because large amounts of memory are needed to store the data. In addition, large amounts of labor are involved in the data reduction and processing.

Discrete recording devices record only portions of the data detected during the recording session. Because they do not record data continuously, they are better suited for use in applications requiring longer recording sessions. A discrete recording device records segments of data at either 1) periodic intervals (time-based recording) or 2) upon the occurrence of a "trigger" event (event-based recording). For example, a time-based recorder may record a short segment of data every three minutes, while an event-based recorder may record a segment of data each time one of the sensed variables satisfies a pre-determined criterion.

Time-based recorders provide an adequate overview of a recording session. However, such recorders may not adequately record an impact or other occurrence. If an impact or other acceleration event occurs during a non-recording interval, vital data concerning the moment of impact will be lost. The recorder may detect and record only the aftermath of such an occurrence during its recording interval.

Even event-based recorders sometimes do not provide sufficient information about an acceleration event for proper analysis. Typically, recorders record either the entire acceleration history or only peak acceleration levels. Recording the entire acceleration history requires large amounts of data storage and labor for analysis. Recording only the peak acceleration levels often provides insufficient information to properly analyze the damage potential of the acceleration event.

SUMMARY OF THE INVENTION

The aforementioned problems are overcome by the present invention wherein an acceleration recorder discriminates acceleration events based on indicated energy content and records only those events that meet or exceed predetermined criteria. The recorder measures acceleration levels with respect to a trigger level. When the trigger is exceeded, the device integrates the acceleration to determine the velocity change during the event. Data is recorded only for events in which the acceleration and velocity change exceed user-defined thresholds.

In the preferred embodiment, the peak acceleration and a date/time stamp are also recorded for the event. The user may configure the device and specify thresholds for acceleration and velocity change, so that only those events which exceed the specified acceleration and velocity change thresholds are actually recorded into permanent memory. Additionally, the user may digitally tune the filter frequency of the device to allow the recorder to be customized for the fragility of individual shipments. At high frequencies, the recorder detects small vibrations which may damage fragile objects; at low frequencies, the recorder only detects substantial impacts.

The analysis of acceleration and velocity change allows users to differentiate between high energy and low energy impacts. This differentiation is especially useful in the transportation industry, in which the energy inherent in the impact largely determines the damage to the transported goods.

The present invention resulted from the recognition that there is a need for more sophisticated analysis techniques of acceleration events. Specifically, there is a need to differentiate high energy events from low energy events. In addition, there is a need for more specific and directed data concerning acceleration events. Simply providing acceleration values does not allow for a complete analysis of the damage potential of an acceleration event and is not sufficient for sophisticated users. The present concept of recording only those events that satisfy both acceleration and velocity change criteria produces data more reflective of high-energy events (i.e. the data of analysis and interest).

These and other objects, advantages, and features of the invention will be more readily understood and appreciated by reference to the detailed description of the preferred embodiment and the drawings.

DETAILED DESCRIPTION OF THE PREFERRED EMBODIMENT

Figure 1:
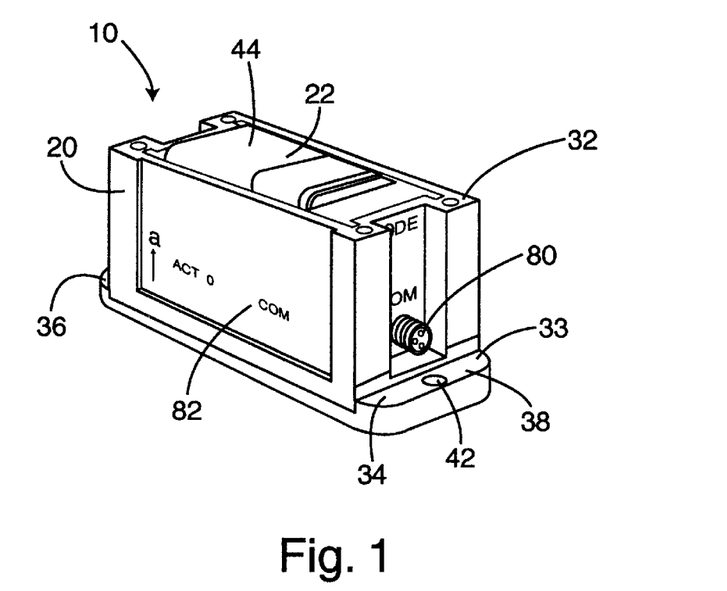
FIG. 1 is a side perspective view of the physical data recorder.
Figure 2:
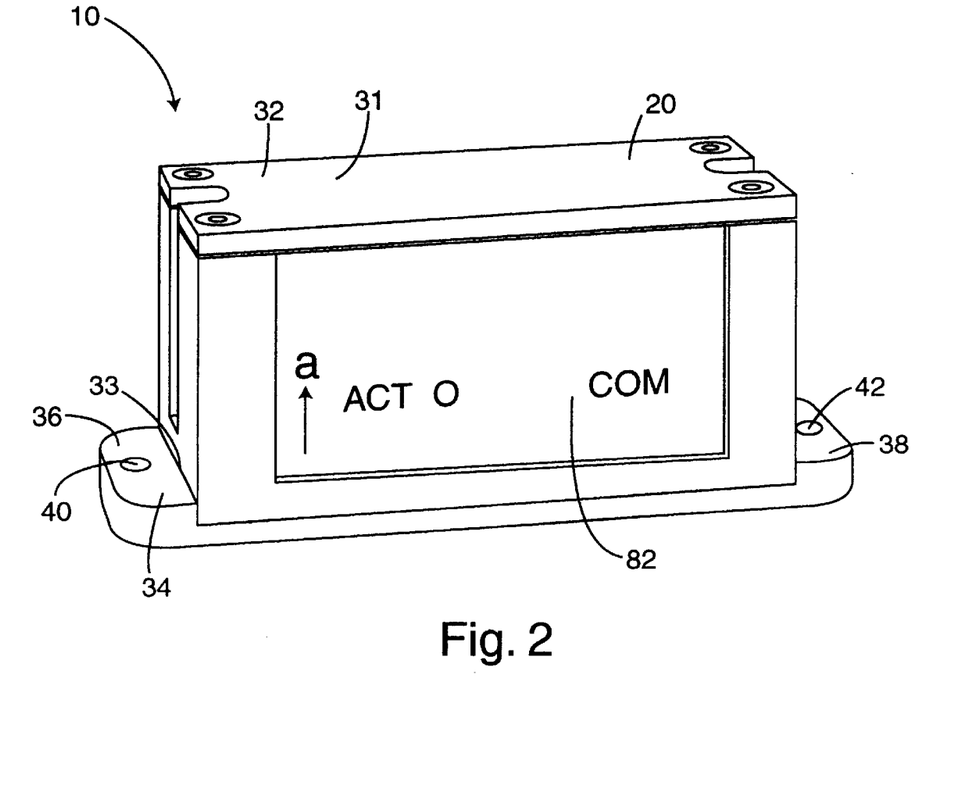
FIG. 2 is a front perspective view of the physical data recorder.

A data recording device according to a preferred embodiment of the invention is illustrated in FIGS. 1 and 2 and generally designated 10. For purposes of this disclosure, the present invention is described in connection with a data recorder for use in the transportation industry. However, the present invention is equally well suited for use in other applications where it is desirable to record events based upon predetermined criteria.

I. The Data Recorder.

The data recorder 10 is typically a self-contained device placed with cargo to measure and record environmental conditions encountered during transportation, such as shock, vibration, temperature, and humidity. When transportation is complete, the data stored in the recorder 10 is "dumped" and analyzed, for example, to help determine how the transportation process can be improved.

Figure 3:
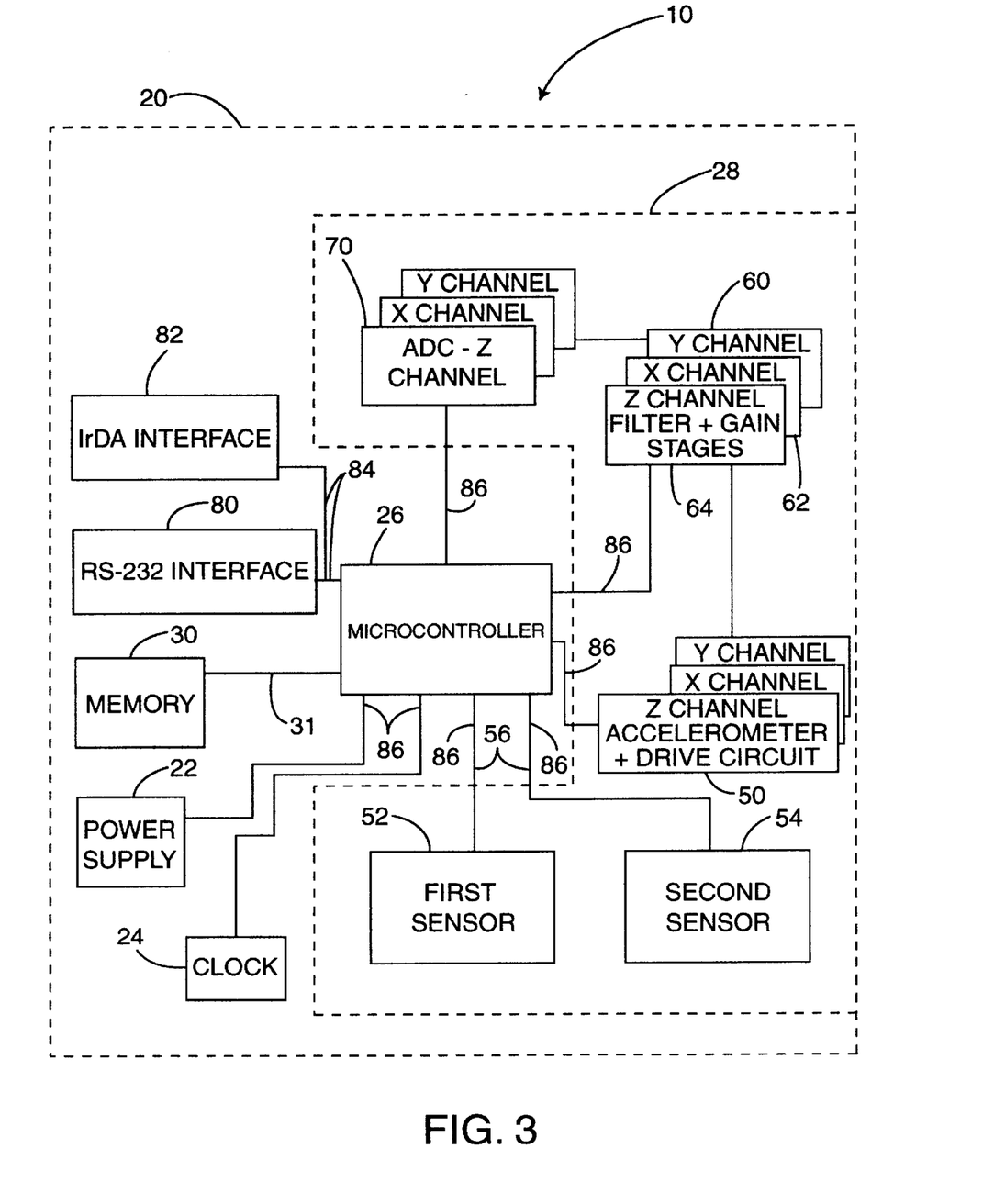
FIG. 3 is a block diagram of the data recorder.

The recorder 10 includes a housing 20 and a power supply 22, internal clock 24, microcontroller 26, sensor section 28, and memory 30 all contained within the housing 20.

The housing 20 surrounds and protects the components of the data recorder 10 and is preferably constructed of anodized aluminum or other sturdy material. A cover 31 is located on the upper surface 32 of the housing 20 to allow for access to the components. The housing 20 is adapted for mounting during use. The lower edges 33 of the housing 20 extend outwardly to form a mounting bracket 34 having first and second portions 36 and 38. The bracket 34 defines two unthreaded holes 40 and 42, one located on each of the first and second portions 36 and 38; the holes 40 and 42 accept #6 screws (not shown) for mounting.

The power 22 supply is preferably a conventional nine volt lithium or alkaline battery 44, although other power means may be used. The power supply 22 provides power to all the components of the data recorder 10. The battery 44 is located just under the upper surface 32 of the housing 20 and may be accessed by removing the cover 31 of the housing 20.

An internal real-time clock 24 is also contained within the housing 20. It provides a date/time stamp for determining when the data was recorded.

The data recorder 10 further includes a microcontroller 26 or other control means which controls the functions of the data recorder 10 and processes the data received from the sensor section 28.

The sensor section 28 provides data to the microcontroller 26 indicative of acceleration and one or more other physical variables, such as temperature and/or humidity. Acceleration data, i.e. shock or vibration, from a single axial or tri-axial accelerometer 50 or other acceleration or instrument means, temperature data from a first sensor 52, and relative humidity data from a second sensor 54 are provided to the microcontroller 26. The first and second sensors 52 and 54 generate analog signals which are directed to the microcontroller 26 through its analog input channels 56. The data recorder 10 can include other sensors to measure other physical variables.

In a preferred embodiment, the accelerometer 50 is an internal, tri-axially mounted piezoresistive accelerometer that provides separate signals for the X-axis, Y-axis, and Z-axis. However, an n-axis accelerometer may be used to provide signals in n-axes. Alternatively, the acceleration for each axis may be measured by a separate accelerometer 50, each appropriately oriented within the recorder 10 to measure acceleration in the appropriate axis. The work point, or voltage level, of the accelerometer 50 is set by the microcontroller 26. The microcontroller 26 digitally controls the drive and offset level of the accelerometer 50, thus relieving the user of the task of manually tuning the accelerometer 50.

The sensor section 28 further includes a filter and gain stage 60 for each channel of the accelerometer 50. The filter and gain stage 60 receives analog accelerometer 50 input on three separate channels in the preferred embodiment, each channel corresponding to one axis of the accelerometer 50.

Additionally, in the preferred embodiment, a 4th order active filter 62 is used. This filter 62 is adjustable from 10–200 Hz so that the recorder 10 may be customized for individual shipments. A relatively high frequency setting, such as 200 Hz, allows the recorder 10 to detect small vibrations, such as may damage a fragile shipment. A relatively low frequency setting, such as 10 Hz, allows the recorder 10 only to detect substantial impacts, such as when rail cars are coupled. Vibrations and small shocks are not detected at low frequencies. The filter 62 is digitally tunable by a user through the use of proprietary software. To set the frequency of the filter 62, the software is programmed and downloaded; there is no need to physically access the filter 62. The software directs the microcontroller 26 to set the offset level (i.e. frequency) that conditions the signal from the accelerometer 50. The gain 64 increases the amplitude of the accelerometer 50 signal, thus allowing for more accurate reading of the signal.

The sensor section 28 also includes an analog-to-digital converter (ADC) 70 for converting the analog signals generated by the accelerometer 50 and passed through the filter and gain stage 60 into digital signals recognizable by the microcontroller 26. Signals reach the ADC 70 if they fall within the low-pass pass band of the filter 62. Signals outside this pass band are attenuated and reach the ADC 70 at a substantially diminished amplitude. In the preferred embodiment, the microcontroller 26 receives accelerometer input from the ADC 70 on three separate channels, each channel corresponding to one axis of the accelerometer 50. Alternatively, the data can be multiplexed.

In addition, the recorder 10 includes a non-volatile EEPROM memory 30 or other memory means for recording the measured data. The memory 30 is accessed via the memory interleaving technique, as typically used in supercomputers and mainframe computers. This technique allows the memory 30 to be accessed significantly faster than in typical recorders utilizing a standard non-volatile memory.

The recorder 10 further includes an RS-232 interface 80 for programming the recorder 10 and for downloading recorded data and an IrDA (infra-red data association, i.e. wireless) interface 82 for wireless programming and downloading or other interface means. IrDA also allows for construction of a completely encapsulated and sealed device which offers advantages in harsh environments and requires no direct physical contact for data communication. The interfaces 80 and 82 are both connected to the microcontroller 26 via asynchronous serial busses 84. All other components of the recorder are connected to the microcontroller 26 via synchronous serial busses 86.

II. Operation of the Data Recorder.

Operation of the data recorder 10 is controlled by firmware that is programmed into the microcontroller at the factory or by other external means. Alternatively, the program can be implemented via hardware, software, or any other programming technique. Creating this firmware based upon the description set forth in the specification is within the capabilities of one having ordinary skill in the programming arts.

Figure 4:
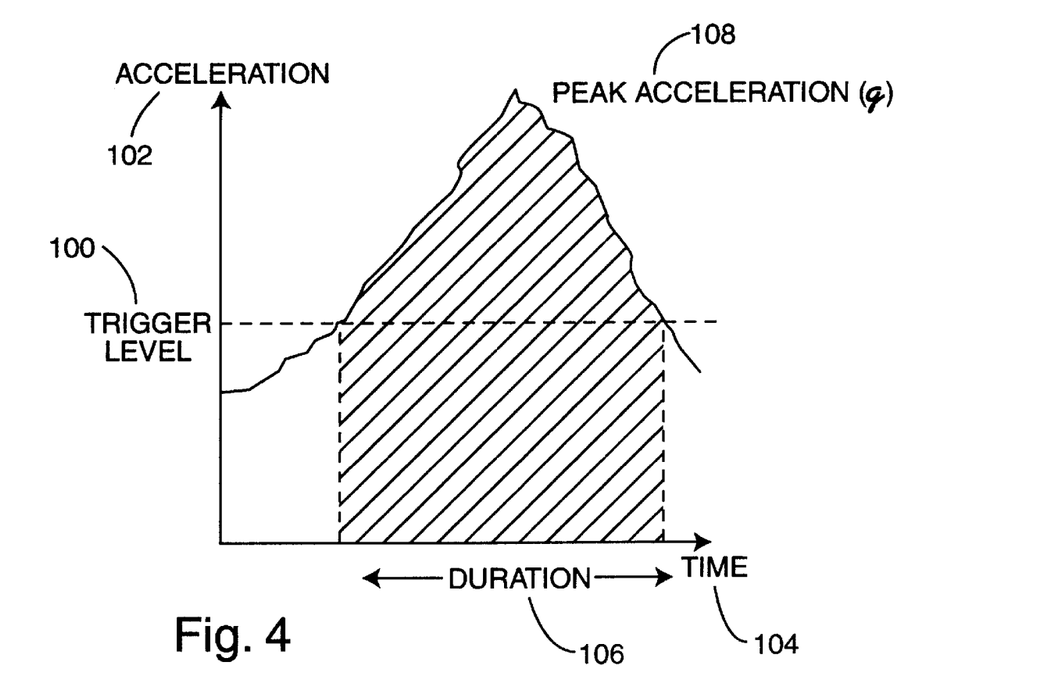
FIG. 4 is a graph of a measured physical variable.

FIG. 4 graphically shows the data from a single acceleration event in a single axis to be captured by the recorder 10. A trigger level 100 is determined by a user. Acceleration 102 is sampled over time 104; typically the acceleration 102 is sampled every millisecond. While the acceleration 102 meets or exceeds the trigger level 100, the acceleration 102 is integrated over the duration 106; the duration 106 is not fixed in length but equals the amount of time 104 during which the acceleration 102 meets or exceeds the trigger level 100. In addition, the peak acceleration 108 for the duration 106 is determined.

Figure 5:
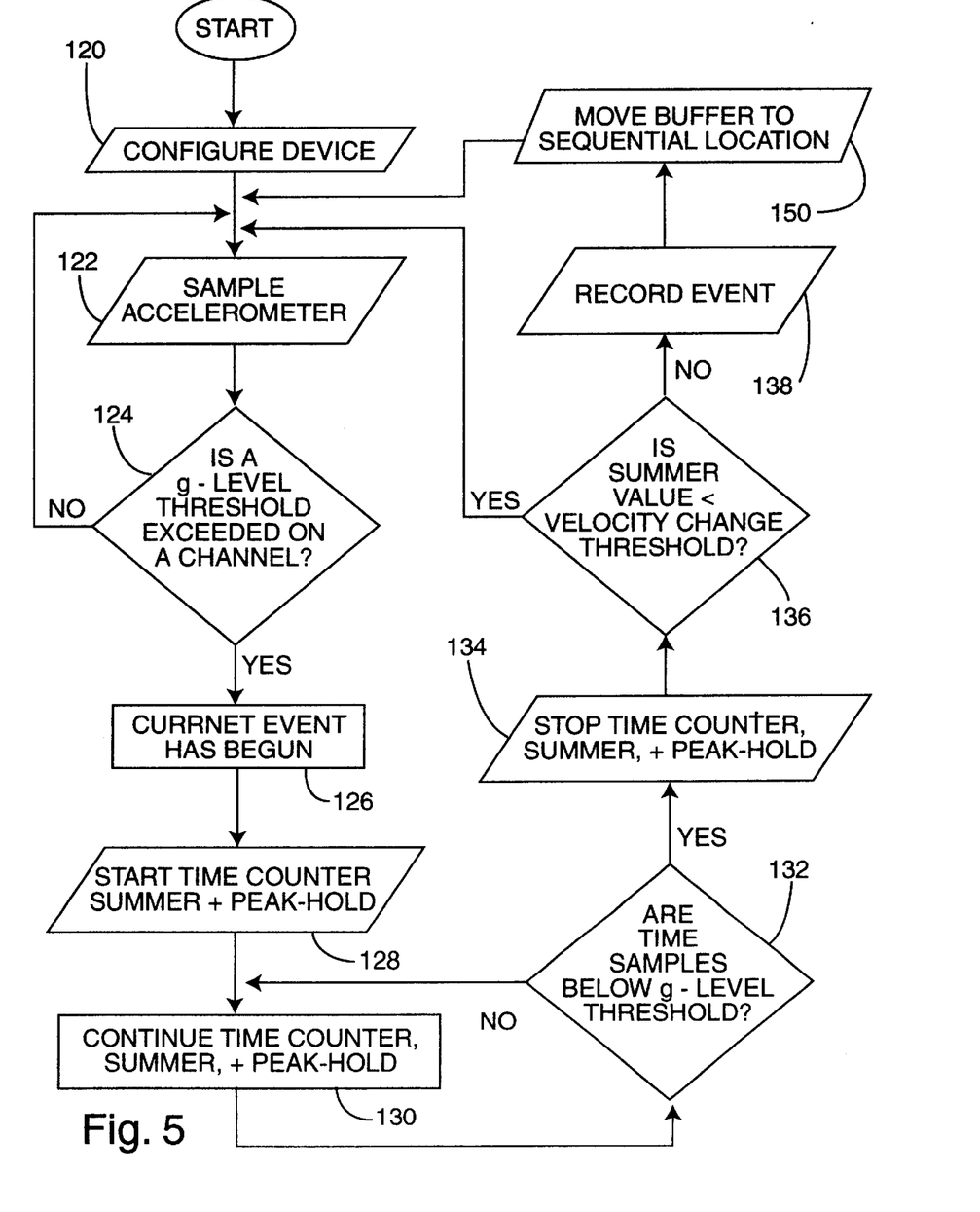
FIG. 5 is a flowchart illustrating the data capture process.

Following the flowchart in FIG. 5, the recorder 10 is configured or programmed 120 with an external device, such as a personal computer, using either the wireless IrDA interface 82 or the RS-232 interface 80. The use of the wireless IrDA interface 82 allows for faster data download to a personal computer or other device.

In configuring the recorder 10, the user selects threshold or trigger levels for acceleration and velocity change or provides other discriminating means. Individual threshold levels are associated with each axis. For example, a user may wish to record the environmental conditions of rail car shipments. For such shipments, the acceleration threshold is typically set within the range 0.1–0.3 G, and the velocity change threshold is set within the range 0.9–1.8 meters per second (M/s). A separate setting of each criterion may be made for each axis. These thresholds may be reset or reprogrammed by the user for each new test or change in environmental conditions. Additionally, the user may set the filter 62 frequency from 10–200 Hz; the appropriate setting is dependent upon the contents of the shipment and the information sought. For example, the typical filter 62 frequency for rail car shipments is 10 Hz; this lower frequency will cause the recorder 10 to ignore relatively high frequency, lower energy vibrations typically present in the rail car.

Additionally, a user may select a maximum duration for an event. An event is terminated when the maximum duration is met, and the event is recorded by default. This prevents the recorder 10 from staying within the same event indefinitely as a result of simple static orientation changes if a first threshold of less than 2 g is selected. After an event termination, the recorder also re-zeroes the accelerometer input channels to prevent repeated triggering on DC acceleration level changes.

As an additional aspect of configuring 120 the recorder 10, it is preferably mounted near or on the material to be tested by the mounting bracket 34 and #6 screws (not shown). The orientation of the recorder 10 does not affect the test data when the tri-axial accelerometer 50 is used. If a single axial accelerometer 50 is used, it should, during installation, be oriented in the appropriate direction in which measurements are to be taken. The surface (not shown) on which the recorder 10 is mounted should be flat and solid, and the recorder 10 should be firmly mounted. Otherwise, there may be substantial inaccuracies in the data from movement of the recorder 10. The recorder 10 may alternatively be secured by other mounting means, such as a magnetic or angular mounting bracket.

The microprocessor 26 begins sampling 122 the ADC 70, which is receiving signal readings from the accelerometer 50 via the filter and gain stage 60. Those signals from the accelerometer 50 which satisfy the filter's 62 low-pass pass band are transferred through the filter and gain stage 60 and into the ADC 70. The sampling 122 continues until one or more of the accelerometer 50 channels is equal to or greater than 124 the pre-set acceleration threshold for that channel. When this criterion is met by a first channel, a current event is defined to have begun 126. The beginning of the current event triggers a time counter for the first channel 128. In addition, a running summer or integrator or other integration means is initiated for the first channel 128. If additional channels meet their associated thresholds during the current event, a counter and running summer are additionally initiated for each of those channels. The running summer for each channel receives, as input, the sampled acceleration values; it integrates these values during the time the first threshold is met for the channel to calculate the velocity change for that channel.

A running peak-hold or other means is also initiated for the first channel 128 and each additional channel which meets its threshold; the peak-hold stores the maximum absolute value of the acceleration values of each channel sampled during the current event. The counter, summer, and peak-hold continue 130 for the first and additional channels during the time the acceleration values of the respective channels exceed their first thresholds.

When the sampled acceleration values fall below the pre-set acceleration threshold for every channel being integrated, the current event is defined to have ended 132. The time counter for each channel is stopped 134 as its sampled values fall below its threshold. The value of the time counter is referred to as the Duration (dT) for that channel. The Duration equals the length of time in which the sampled acceleration values exceed the acceleration threshold. In addition, the running summer for each channel is stopped 134 as its sampled values fall below its threshold. The value of the running summer is referred to as the velocity change (dV) for that channel and that current event. The velocity change is equal to the summation of the sampled acceleration values during the time the first threshold was met (i.e. the time integration of acceleration). The peak-hold for each channel is also stopped 134 as its sampled values fall below its threshold. The value of the peak-hold is referred to as the maximum acceleration for that channel.

The velocity change (dV) for each channel is then compared to the pre-set velocity change threshold for its respective channel 136. If, for every channel, the velocity change (dV) is less than the velocity change threshold, then the Duration, velocity change, and the maximum acceleration of every channel are discarded, and the current event is not recorded. The microcontroller 26 continues sampling 122 the ADC 70 as it receives signals from the accelerometer 50 via the filter and gain stage 60, and the microcontroller 26 continues to evaluate if the sampled values exceed the pre-set acceleration thresholds.

Figures 6, 7:
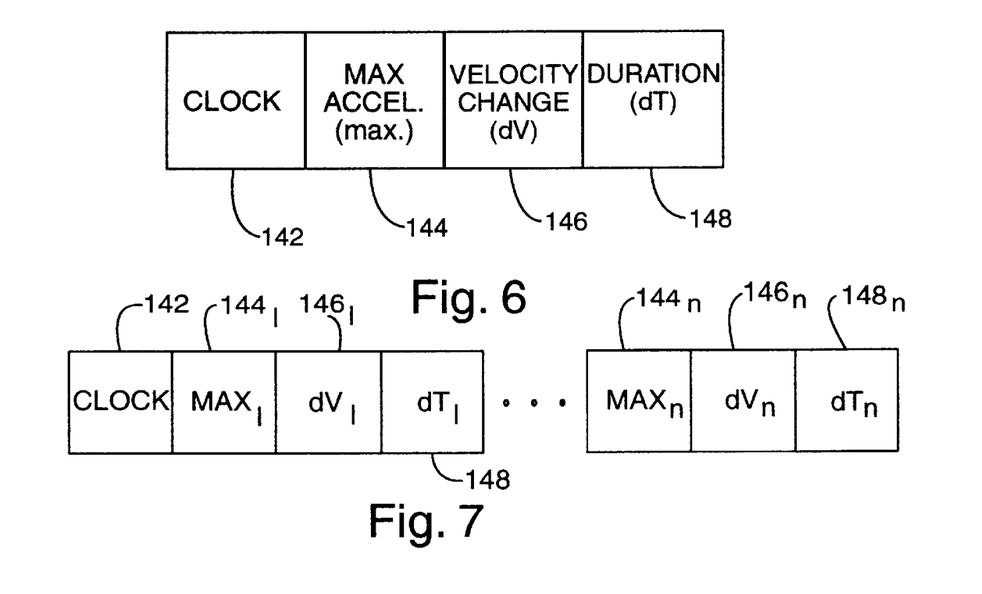
FIG. 6 is a block diagram of the data to be recorded from an event for a recorder having a single axis.
FIG. 7 is a block diagram of the data to be recorded from an event for a recorder having n-axes.

However, if, for one or more of the channels, the velocity change is greater than or equal to the velocity change threshold, then an event marker is written 138 into EEPROM memory or recorded by other means. As seen in FIGS. 6 and 7, the event marker consists of a real-time clock signal 142 from which the event date and time can be determined, and for every channel, the maximum acceleration 144, $144_1$, and $144_n$ the velocity change (dV) 146, $146_1$, and $146_n$ and the event Duration (dT) 148, $148_1$, and $148_n$. Zero values are recorded for the maximum acceleration, velocity change, and duration for each channel for which the acceleration level does not exceed its respective pre-set acceleration threshold.

Additionally, at the end of every current event, the recorder 10 performs an auto-zero on the accelerometer input signals. The input signals are re-zeroed to remove any (DC) offset changes on the inputs.

The current event data is then moved 150 to a new location in the EEPROM memory 30, and the microcontroller 26 again begins sampling the ADC 70 as it receives signals from the accelerometer 50 via the filter and gain stage 60.

The recorder 10 may optionally be set to measure and record other physical variables, such as temperature and/or humidity data, during the recording session. This data is recorded at pre-set, user-defined time intervals (e.g. once/minute or once/hour).

In an alternative embodiment, the recorder 10, in place of or in addition to recording 138 the data when both the acceleration and velocity change threshold are exceeded, may generate a trigger signal, such as a rising or falling TTL pulse. Such a signal can be sent to another device via the RS-232 serial interface 80 or the IrDA interface 82. The trigger signal can be used to shut down machines in the event of an impact, earthquake, or other such occurrence.

The above descriptions are those of preferred embodiments of the invention. Various alterations and changes can be made without departing from the spirit and broader aspects of the invention as defined in the appended claims, which are to be interpreted in accordance with the principles of patent law including the doctrine of equivalents.

What is claimed is:

1. A method for recording acceleration data comprising the steps of:
    monitoring the acceleration data with respect to a preselected first criterion;
    integrating the acceleration data during each interval that the acceleration data meets the first criterion to produce a velocity change value;
    comparing said velocity change value to a preselected second criterion;
    if said velocity change value meets the second criterion, recording an event marker; and
    if said velocity change does not meet the second criterion, discarding said velocity change value.

2. The method of claim 1 wherein said event marker comprises said velocity change value.

3. The method of claim 1 further comprising the step of defining a peak-hold value after said integrating step, said peak-hold value sampling the acceleration data and storing a highest absolute value of the acceleration data.

4. The method of claim 3 wherein said event marker comprises said velocity change value, said peak-hold value, an event duration equal to a duration of said integrating step, and a clock signal whereby a date and time associated with the acceleration data may be recorded.

5. The method of claim 1 wherein:
    said monitoring step includes monitoring acceleration data along a plurality of axes;
    said integrating step includes integrating the acceleration data of at least one of said axes when the data meets the first criterion;
    said comparing step includes comparing the velocity change value for the at least one axis to the second criterion; and
    said recording step includes recording the event marker for the at least one axis for which said velocity change value meets the second criterion.

6. The method of claim 1 wherein said first and second criteria are first and second user-defined, pre-set threshold levels, respectively.

7. The method of claim 6 further comprising a first step of determining the first and second threshold levels and a filtering frequency, said frequency selectable and tunable across a range.

8. A method for monitoring, discriminating, and recording data comprising the steps of:
    monitoring data indicative of a physical variable and noting discrete events when the data exceeds a first trigger;
    integrating the data during each event to produce an integrated value; and
    recording information related to each event only when said integrated value exceeds a second trigger.

9. The method of claim 8 wherein said physical variable data includes data representative of acceleration and said integrated value is representative of velocity change.

10. The method of claim 8 wherein said recording step further includes recording said information in a memory and moving said memory to another location after recording said information and not moving said memory and discarding said information if said integrated value does not meet said second trigger.

11. The method of claim 10 wherein said recording step further includes recording an event marker, said marker including a duration of each discrete event, a maximum of said physical variable noted during each discrete event, said integrated value, and a clock signal whereby a date and time of said integrating step may be determined.

12. The method of claim 8 wherein:
    said monitoring step includes monitoring physical variable data along a plurality of axes;
    said integrating step includes integrating the physical variable data of at least one of said axes during each event; and
    said recording step includes recording an event marker for the at least one axis for which said integrated value exceeds the second trigger.

13. The method of claim 12 wherein said first and second triggers are first and second user-defined, pre-set threshold levels, respectively.

14. The method of claim 13 further comprising a first step of determining said first and second threshold levels and a filtering frequency, said threshold levels and said frequency based upon physical variables to be noted, said frequency selectable and tunable across a range.

15. A method for recording data corresponding to physical variables comprising:
    monitoring a first variable;
    when said first variable meets a first threshold, beginning integration of said first variable to produce an integration value;
    when said first variable does not meet said first threshold, ending integration of said first variable;
    noting a peak value equal to a highest absolute value of said first variable encountered during said integration;
    comparing said integration value to a second threshold; and
    recording said integration value and said peak value only if the integration value meets said second threshold.

16. The method of claim 15 wherein said first variable represents acceleration data and said integration value represents velocity change.

17. The method of claim 15 further comprising a first step of determining said first and second thresholds and a filtering frequency, said thresholds and said frequency based upon recording data to be collected, said frequency selectable and tunable across a range.

18. The method of claim 15 wherein:
    said monitoring step includes monitoring the first variable for a plurality of axes;
    said beginning integration step includes integrating the first variable of at least one of said axes to produce an integration value when the first variable meets the first threshold;
    said ending integration step includes ending integration of the first variable of at least one of said axes; and
    said comparing step includes comparing the integration value for the at least one axis to the second threshold and recording said integration value and peak value for the at least one axis for which the integration value meets the second threshold.

19. The method of claim 15 wherein said recording step further includes recording a duration of said integrating step, and a clock signal whereby a date and time of said integrating step may be determined.

20. A data recorder for recording physical variables of transient acceleration events, comprising:
a housing;
an instrument means for sensing at least one physical variable, said instrument means housed within said housing;
a memory means for storing data, said memory means including a plurality of locations, said memory means housed within said housing; and
a control means for repeatedly polling said instrument means to generate a plurality of measurements, said control means including a discriminating means for determining a beginning and ending of a current event and further including integration means to integrate said one physical variable during said current event and define an integration value, said control means further including a comparing means to compare said integration value to a criterion and a recording means for recording said integration value if said integration value meets said criterion, said control means housed within said housing.

21. The recorder of claim 20 further comprising:
an interface means whereby said data recorder may communicate with an external device, said interface means housed within said housing.

22. The recorder of claim 21 wherein said interface means includes a wireless communication device.

23. The recorder of claim 20 wherein each said location of said memory means includes memory space for a clock value, a peak value of said one physical variable, said integration value, and an event duration.

24. The recorder of claim 20 wherein said control means further includes peak-hold means to determine a maximum absolute value of said one physical variable during said current event.

25. The recorder of claim 20 wherein:
said instrument means senses said physical variable along a plurality of axes;
a beginning of said current event defined as when the physical variable of at least one of said axes meets a first criteria;
an ending of said current event defined as when the physical variable for the at least one axis does not meet the first criteria; and
said control means including a recording means for recording a peak-hold value and the integration value for said at least one axis.

26. The recorder of claim 20 wherein the one physical variable is acceleration.

27. The recorder of claim 25 wherein said instrument means additionally senses and records in time-based intervals at least one additional physical variable.

28. The recorder of claim 27 wherein said at least one additional physical variable sensed and recorded is temperature and/or humidity data.

29. The recorder of claim 20 wherein said discriminating means further comprises external means for configuring first and second thresholds and a filter frequency, said first threshold determining said beginning and ending of said current event, said second threshold determining information to be placed in said memory means, and said filter frequency selectable and tunable across a range.

30. The recorder of claim 20 whereby said memory means is accessed by a memory interleaving technique designed to reduce or avoid memory dependent internal time delays.

31. A data recorder for sensing physical variables, comprising:
a housing;
an acceleration mechanism for producing acceleration data representative of acceleration, said acceleration mechanism housed within said housing;
a processor to sample the acceleration data and define a beginning of a current event when the acceleration data meets a first criterion, said processor further controlling a counter, a summer, and a peak-hold, said counter, summer, and peak-hold being initiated at said beginning of said current event, said counter monitoring a duration of said current event, said summer integrating said sampled acceleration data over said duration to produce an integration value, and said peak-hold monitoring a maximum absolute value of said sampled acceleration data for said duration of said current event, said processor defining an ending of said current event when said sampled acceleration data do not meet said first criterion, said processor housed within said housing;
a data memory for recording a date/time value, said peak-hold, said integration value, and said duration if said integration value meets a second criterion, said data memory housed within said housing; and
at least one communication port whereby said data memory may be moved to an external device and through which said first and second criteria may be defined, said communication port housed within said housing.

32. The recorder of claim 31 wherein said first and second criteria are further defined as user-determined, pre-set first and second threshold levels, respectively, said first threshold level representing acceleration and said second threshold level representing velocity change.

33. The recorder of claim 31 further comprising external means for configuring said first and second threshold levels and a filter frequency, said filter frequency selectable and tunable across a range.

34. The recorder of claim 31 wherein said communications port includes a wireless communications device.

35. The recorder of claim 31 further comprising at least one mechanism for sensing and recording in time-based intervals at least one additional physical variable, said at least one mechanism housed within said housing.

36. The recorder of claim 34 wherein said at least one additional physical variable sensed and recorded is temperature and/or humidity data.

37. The recorder of claim 31 wherein:
said mechanism produces data along a plurality of axes;
said beginning of said current event being defined as when a sampled value of at said least one axis meets said first criterion, said counter, summer, and peak-hold being initiated for said at least one axis at said beginning of said current event;
an ending of said current event being defined as when said sampled acceleration data for said at least one axis does not meet said associated first criterion; and
said data memory recording said peak-hold, integration value, and duration for said at least one axis for which said integration value meets said second criterion.

38. An acceleration data recorder comprising:

a housing;

an accelerometer means mounted within said housing for producing an acceleration signal;

memory means for storing data;

control means coupled to said accelerometer means and said memory means for receiving the acceleration signal and recording selected data in said memory means, said control means including first discriminating means for determining when the acceleration signal exceeds a first trigger value corresponding to an event, integrating means for integrating the acceleration signal during the event to produce a velocity change signal, and second discriminating means for determining when the velocity change signal exceeds a second trigger value, said control means causing data corresponding to the event to be recorded in said memory means only when the velocity change signal exceeds the second trigger value.

39. The recorder of claim 38 wherein said memory means includes memory space for a clock value, a peak value of said acceleration signal, said velocity change signal, and a duration of said acceleration signal exceeding said first trigger.

40. The recorder of claim 38 wherein:

said accelerometer further produces signals along a plurality of axes; and said first discriminating means determining when the acceleration signal exceeds the first trigger value for said at least one axis, said integrating means integrating the signal for said at least one axis, and said second discriminating means determining when the velocity change signal exceeds the second trigger value for said at least one axis.

41. The recorder of claim 38 wherein said first and second discriminating means further comprises external means for configuring user-determined, pre-set said first and second trigger values and a filter frequency, said filter frequency selectable and tunable across a range.

42. The recorder of claim 41 wherein said external means includes a wireless communications device.

43. The recorder of claim 38 whereby said memory means is accessed by a memory interleaving technique designed to reduce or avoid memory dependent internal time delays.

44. The recorder of claim 38 further comprising at least one mechanism for sensing and recording in time-based intervals at least one additional physical variable, said at least one mechanism is housed within said housing.

45. The recorder of claim 44 wherein said at least one additional physical variable sensed and recorded is temperature and/or humidity data.

* * * * *

UNITED STATES PATENT AND TRADEMARK OFFICE
CERTIFICATE OF CORRECTION

PATENT NO.   : 6,122,959  
DATED        : September 26, 2000  
INVENTOR(S)  : Hoshal et al.

Page 1 of 1

It is certified that error appears in the above-identified patent and that said Letters Patent is hereby corrected as shown below:

Column 10, Claim 36, Line 52:
"34" should be --35--

Signed and Sealed this

Third Day of July, 2001

*Attest:*

*Attesting Officer*

NICHOLAS P. GODICI  
*Acting Director of the United States Patent and Trademark Office*